United States Patent
Xiao et al.

(10) Patent No.: US 7,356,076 B2
(45) Date of Patent: Apr. 8, 2008

(54) SYSTEM AND METHOD SUPPORTING AUTO-RECOVERY IN A TRANSCEIVER SYSTEM

(75) Inventors: Kang Xiao, Irvine, CA (US); Mario Caresosa, Rancho Santa Margarita, CA (US); Hongtao Jiang, Irvine, CA (US); Randall Stolaruk, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1030 days.

(21) Appl. No.: 10/313,258

(22) Filed: Dec. 5, 2002

(65) Prior Publication Data

US 2004/0086030 A1 May 6, 2004

Related U.S. Application Data

(60) Provisional application No. 60/423,070, filed on Nov. 1, 2002, provisional application No. 60/423,166, filed on Nov. 1, 2002, provisional application No. 60/423,034, filed on Nov. 1, 2002, provisional application No. 60/423,071, filed on Nov. 1, 2002, provisional application No. 60/423,072, filed on Nov. 1, 2002, provisional application No. 60/423,074, filed on Nov. 1, 2002, provisional application No. 60/423,294, filed on Nov. 1, 2002.

(51) Int. Cl.
*H04B 1/38* (2006.01)

(52) U.S. Cl. .................................................. 375/219

(58) Field of Classification Search ................ 327/141, 327/142, 144, 162, 292; 375/219, 224, 228
See application file for complete search history.

(56) References Cited

U.S. PATENT DOCUMENTS

| 6,144,674 A | * | 11/2000 | Peres et al. ............... 370/516 |
|---|---|---|---|
| 6,155,674 A | * | 12/2000 | Figueredo et al. ........... 347/63 |
| 6,255,866 B1 | * | 7/2001 | Wolaver et al. ............. 327/107 |
| 6,546,024 B1 | * | 4/2003 | Sharper et al. ............. 370/470 |
| 7,003,715 B1 | * | 2/2006 | Thurston ................... 714/782 |
| 2001/0043107 A1 | * | 11/2001 | Komoto ..................... 327/299 |
| 2002/0110157 A1 | * | 8/2002 | Jorgenson et al. .......... 370/537 |
| 2003/0034820 A1 | * | 2/2003 | Starr et al. ................ 327/292 |
| 2004/0086030 A1 | * | 5/2004 | Xiao et al. ................. 375/219 |

OTHER PUBLICATIONS

Andreas Kaufmann, "G.709: Optical Transport Network (OTN)", Actema Technical Report, Feb. 2002, 15 pages.

* cited by examiner

*Primary Examiner*—Khai Tran
(74) *Attorney, Agent, or Firm*—McAndrews, Held & Malloy, Ltd.

(57) ABSTRACT

A method and apparatus are disclosed to aid a transceiver chip, in a serial data communications system, in recovering from a system-side, out-bound data clocking problem. If a problem with a primary clock signal, used to clock data from a system-side of a transceiver chip through at least a part of an out-bound data path of the transceiver chip, is detected, then a more reliable secondary clock signal is substituted for the primary clock signal. Once it is determined that the primary clock signal has recovered, the primary clock signal is switched back to and certain discrete circuits of the out-bound data path of the transceiver chip are automatically reset in hardware without the need for system level intervention to avoid any problems due to clock glitches on the primary clock signal during the switching.

23 Claims, 5 Drawing Sheets

SYSTEM AND METHOD SUPPORTING AUTO-RECOVERY IN A TRANSCEIVER SYSTEM

CROSS-REFERENCE TO RELATED APPLICATIONS/INCORPORATION BY REFERENCE

Each of the following applications are related to the present application and are incorporated herein by reference in their entirety:

| Ser. No. | Title | Docket No. | Filed | Inventor(s): |
| --- | --- | --- | --- | --- |
| 60/423,070 | Transceiver System and Method Supporting Variable Rates and Multiple Protocols | 14103US01 | Nov. 01, 2002 | Vikram Natarajan, Kang Xiao, Mario Caresosa, Jay Proano |
| 60/423,166 | Method and System for a Three Conductor Transceiver Bus | 14104US01 | Nov. 01, 2002 | Chenmin Zhang, Steve Thomas, Randall Stolaruk |
| 60/423,034 | Multi-Rate On-Chip OCN Filter for a Transceiver System | 14107US01 | Nov. 01, 2002 | Ichiro Fujimori, Mario Caresosa, Namik Kocaman |
| 60/423,071 | Method and System for Synchronizing a Transceiver and a Downstream Device in an Optical Transmission Network | 14106US01 | Nov. 01, 2002 | Jay Proano, Sheila Qiu, Tim Chan, Hongtao Jiang |
| 60/423,072 | Transceiver System and Method Supporting Multiple Selectable VCOs | 14108US01 | Nov. 01, 2002 | Mario Caresosa, Namik Kocaman |
| 60/423,074 | Configurable VCO System and Method | 14109US01 | Nov. 01, 2002 | Mario Caresosa, Namik Kocaman, Afshin Momtaz |

This application also makes reference to, claims priority to and claims the benefit of U.S. provisional patent application serial No. 60/423,294 filed on Nov. 1, 2002 having attorney docket no. 14105US01.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Embodiments of the present invention relate generally to an apparatus and method corresponding to a transceiver chip that is part of an optical serial data communications system, and more particularly to automatic recovery within the transceiver chip.

High-speed digital communication networks over copper and optical fiber are used in many network communication and digital storage applications. Ethernet and Fibre Channel are two widely used communication protocols used today and continue to evolve to respond to the increasing need for higher bandwidth in digital communication systems.

The Open Systems Interconnection (OSI) model (ISO standard) was developed to establish standardization for linking heterogeneous computer and communication systems. The OSI model includes seven distinct functional layers including Layer 7: an application layer; Layer 6: a presentation layer; Layer 5: a session layer; Layer 4: a transport layer; Layer 3: a network layer; Layer 2: a data link layer; and Layer 1: a physical layer. Each OSI layer is responsible for establishing what is to be done at that layer of the network but not how to implement it.

Layers 1 to 4 handle network control and data transmission and reception. Layers 5 to 7 handle application issues. Specific functions of each layer may vary to a certain extent, depending on the exact requirements of a given protocol to be implemented for the layer. For example, the Ethernet protocol provides collision detection and carrier sensing in the data link layer.

The physical layer, Layer 1, is responsible for handling all electrical, optical, and mechanical requirements for interfacing to the communication media. The physical layer provides encoding and decoding, synchronization, clock data recovery, and transmission and reception of bit streams. Typically, high-speed electrical or optical transceivers are the hardware elements used to implement this layer.

The Synchronous Optical Network (SONET) is an interface standard for synchronous optical fiber transmission, applicable to the Physical Layer of the OSI Reference Model.

SONET comprises a set of signal rates for transmitting and receiving serial digital data signals over optical fiber. The base rate (OC-1) is 51.84 Mbps. Multiples of the base rate are also provided. For example:

OC-3 (155.52 Mbps)
OC-12 (622.08 Mbps)
OC-48 (2.488 Gbps)

Transceiver chips may typically be characterized as comprising two sections that interface between a line-side of a communication link and a system-side of the communication link. An inbound section receives data from the line-side of the communication link and processes and passes the data to the system-side of the communication link. An outbound section receives data from the system-side of the communication link and processes and passes the data to the line-side of the communication link. The line-side of the outbound section of the transceiver chip typically transmits the data in a serial format to an electrical-to-optical converter which transmits the data over a fiber optic cable. The system-side of the outbound section of the transceiver chip typically receives parallel or serial digital data from a system framer or ASIC.

When data is being received into the outbound section of the transceiver chip from the system-side, the data is clocked into the transceiver chip on the system-side by a primary clock signal. Typically, if a problem occurs with the primary clock signal, the chip may hang, and the entire outbound section of the transceiver chip must be reset to an initial state by way of outside system level intervention. The system level reset process may take an undesirably long time and corrupted data may be transmitted out of the line-side of the outbound section of the transceiver chip.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Certain embodiments of the present invention provide a method and apparatus to aid a transceiver chip in recovering from a system-side, out-bound data clocking problem.

A method of the present invention provides for detecting a problem with a primary clock signal used to clock data from a system-side of a transceiver chip through at least a part of an out-bound data path of the transceiver chip. When a problem is detected, a more reliable secondary clock signal is substituted for the primary clock signal. Once it is determined that the primary clock signal has recovered, the primary clock signal is switched back to and certain discrete circuits of the out-bound data path of the transceiver chip are automatically reset in hardware without the need for system level intervention, to avoid any problems due to clock glitches on the primary clock signal during the switching.

Apparatus of the present invention comprises at least one clock error detector within a transceiver chip to generate at least one fault signal indicating whether or not there is a problem with a primary clock signal used to clock data from a system-side of the transceiver chip through at least a part of an out-bound data path of the transceiver chip. At least one multiplexer, within the transceiver chip, is responsive to the at least one fault signal to switch back and forth between the primary clock signal and a more reliable secondary clock signal. At least one reset circuit is used to generate at least one reset signal in response to switching back to the primary clock signal in order to reset certain discrete circuits of the out-bound data path of the transceiver chip without the need for any system level intervention, to avoid any problems due to clock glitches on the primary clock signal during the switching.

These and other advantages, aspects and novel features of the present invention, as well as details of an illustrated embodiment thereof, will be more fully understood from the following description and drawings.

DETAILED DESCRIPTION OF THE INVENTION

Figure 1:
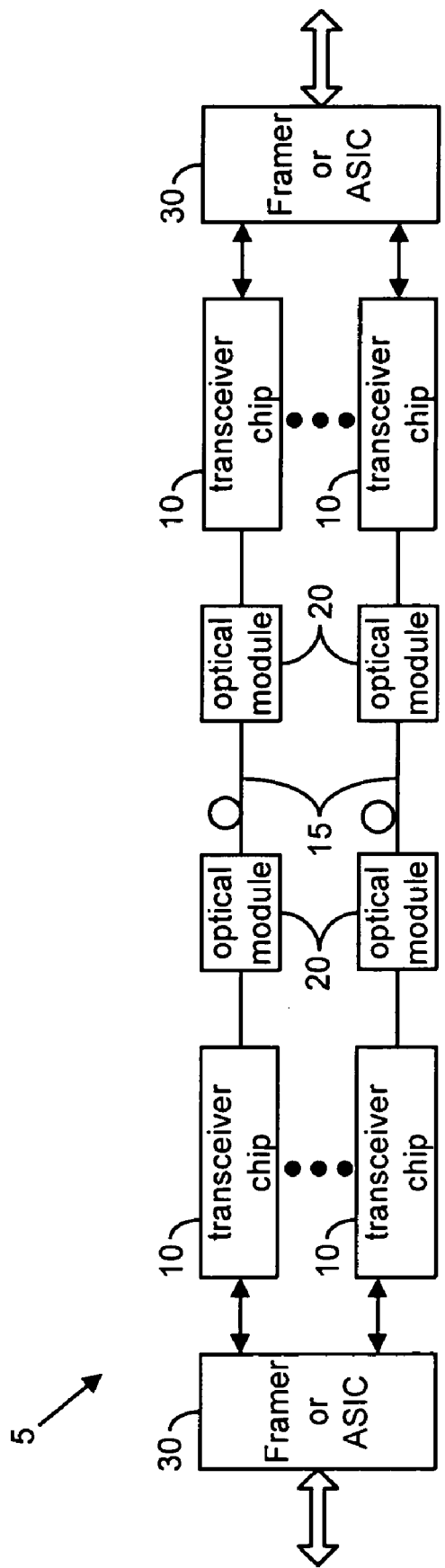
FIG. 1 is a schematic block diagram of part of an optical serial data communications system using a transceiver chip in accordance with an embodiment of the present invention.

FIG. 1 is a schematic block diagram of part of an optical serial data communications system 5 using transceiver chips 10 in accordance with an embodiment of the present invention. The communications system 5 shows optical fiber 15 linking optical modules 20. The optical modules transmit and receive optical serial data over the optical fiber 15 and convert the optical serial data to electrical serial data and vice versa.

The transceiver chips 10 interface to the optical modules 20 on the line-side to transmit and receive electrical serial data to and from the optical modules 20. The transceiver chips 10 perform various communications functions including clock data recovery (CDR), clock generation, data de-serialization and serialization, synchronization, data decoding and encoding, and transmission and reception of bit streams in accordance with an embodiment of the present invention. The transceiver chips 10 interface to a Framer or ASIC 30 on the system-side to format, transmit, and receive digital data to and from the rest of the communications system 5.

Figure 2:
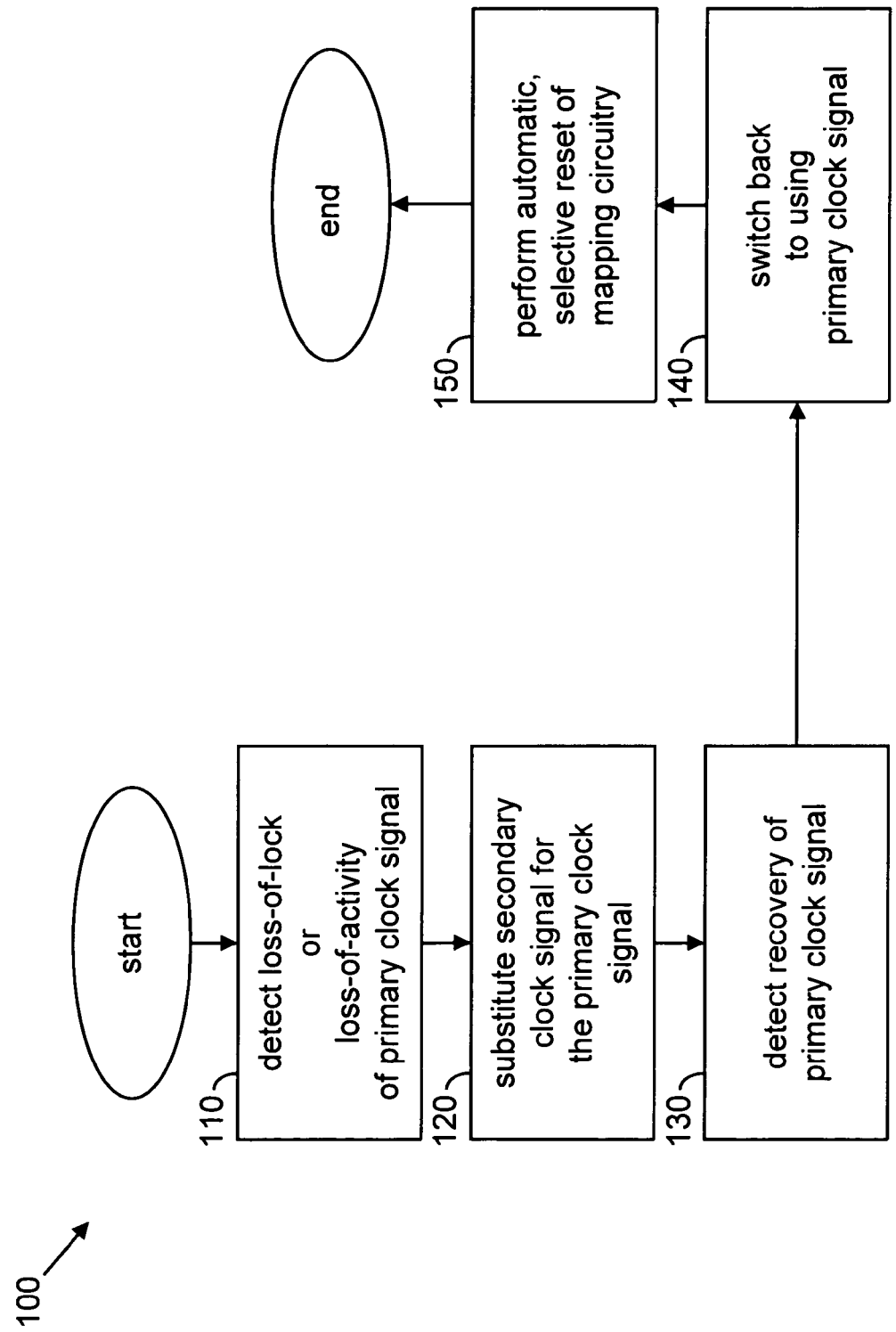
FIG. 2 is a flow chart of a method to automatically reset a portion of an outbound section of the transceiver chip of FIG. 1 in accordance with an embodiment of the present invention.
Figure 3:
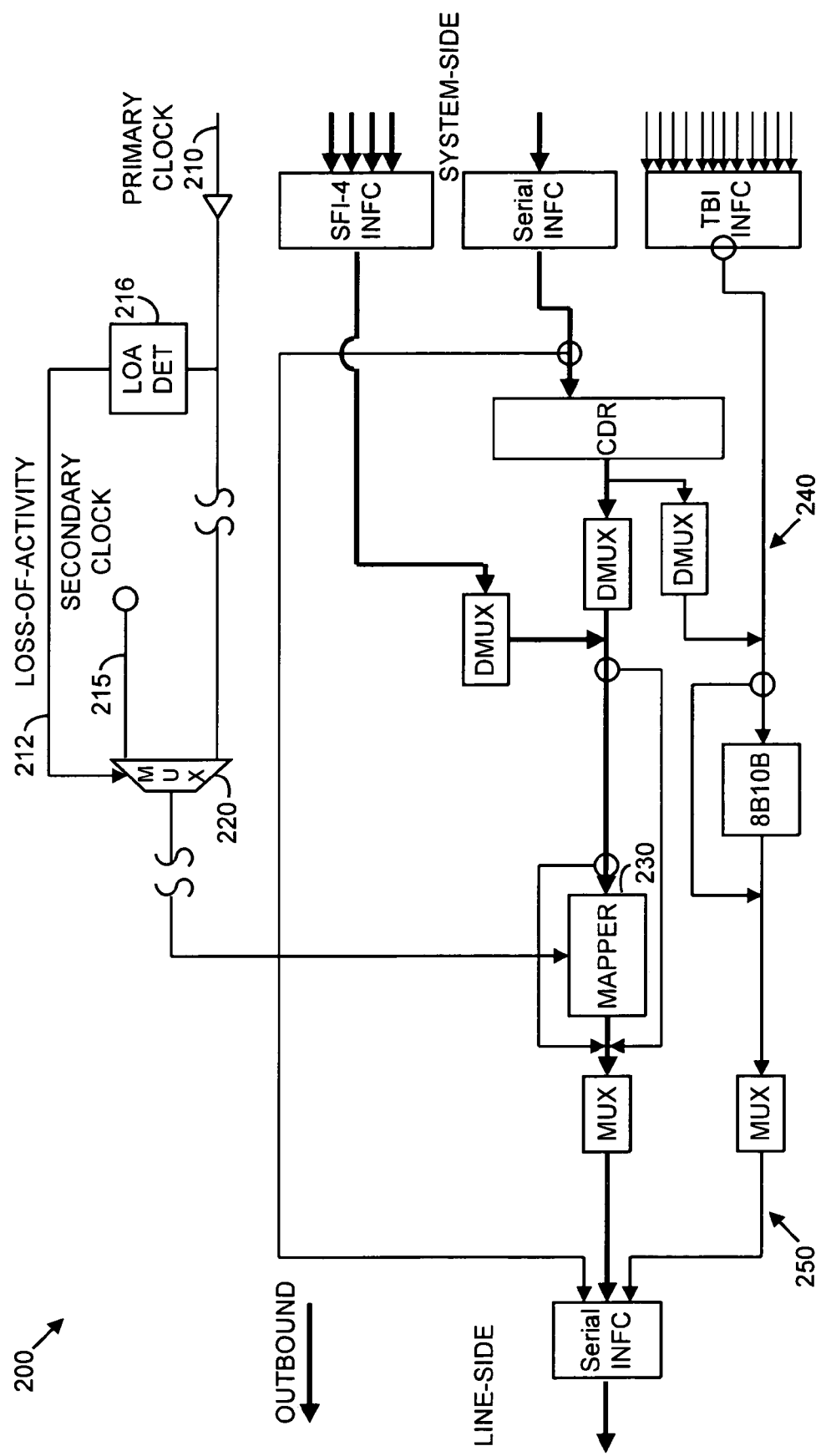
FIG. 3 is a schematic block diagram of an outbound section of the transceiver chip of FIG. 1 hi-lighting a parallel-to-serial data path in accordance with an embodiment of the present invention.

In an embodiment of the present invention, if a problem occurs with a primary clock signal used to clock data into an outbound section 200 (see FIG. 3) of a transceiver chip 10 from a system-side of the transceiver chip 10, a method 100 (see FIG. 2) is used to automatically recover from the problem.

In an embodiment of the present invention, the outbound section 200 of the transceiver chip 10 comprises a receive subsection 240 and a transmit subsection 250.

Figure 4:
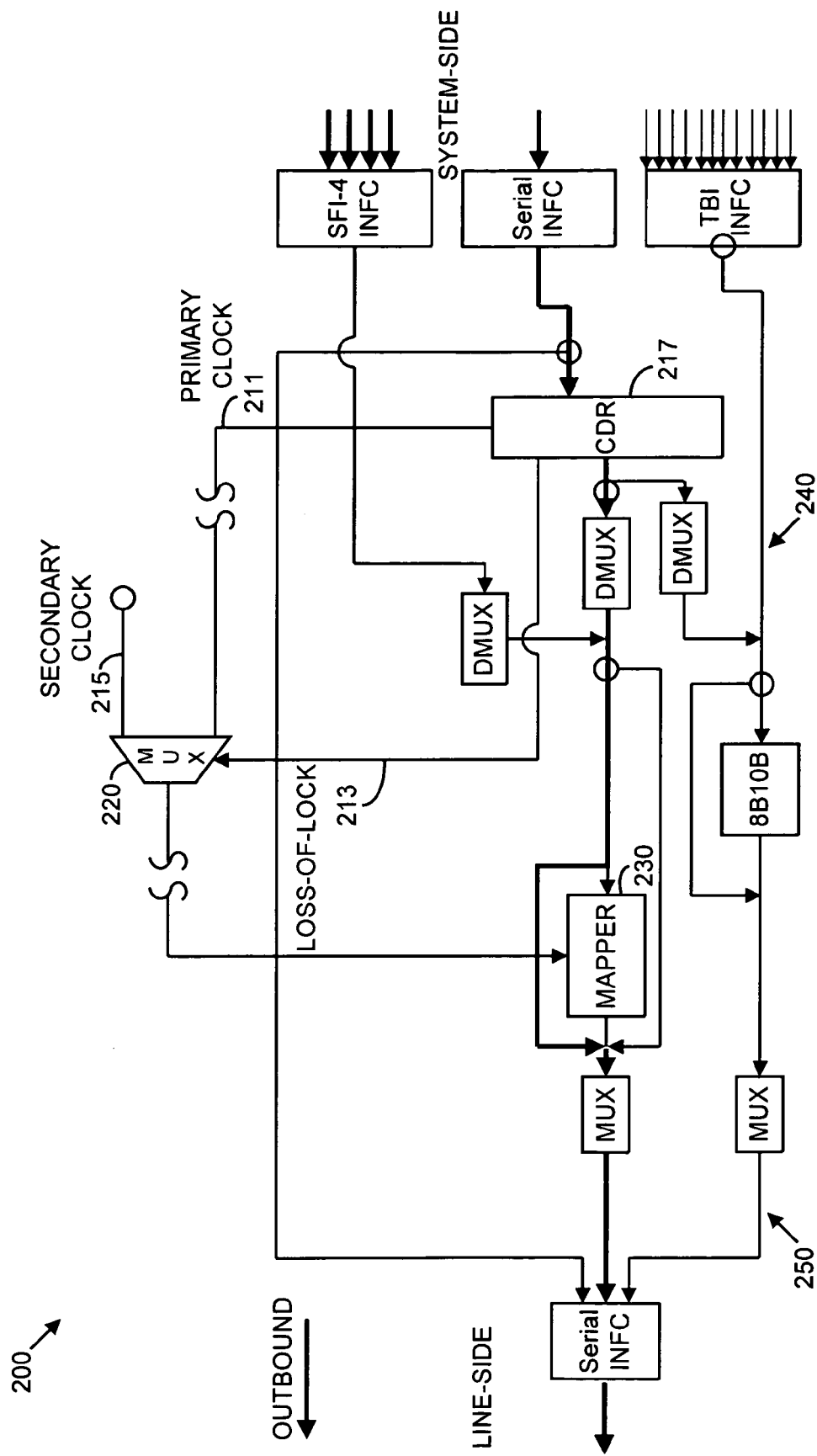
FIG. 4 is a schematic block diagram of an outbound section of the transceiver chip of FIG. 1 hi-lighting a serial-to-serial data path in accordance with an embodiment of the present invention.

In step 110 of method 100, a problem with a primary clock 210 (see FIG. 3) is detected as a loss-of-activity condition 212 in a parallel-to-serial SONET mode of the transceiver chip 10 by loss-of-activity detector 216 in accordance with an embodiment of the present invention. A problem with a primary clock 211 (see FIG. 4) is detected as a loss-of-lock condition 213 in a serial-to-serial SONET mode of the transceiver chip 10 by clock-data-recovery (CDR) circuit 217 in accordance with an embodiment of the present invention.

When a loss-of-lock or loss-of-activity condition is detected, in step 120, a more reliable secondary clock signal 215 is substituted for the primary clock signal (210 or 211 depending on mode) by selecting the secondary clock signal 215 through multiplexer 220 in accordance with an embodiment of the present invention.

When the loss-of-lock or loss-of-activity condition goes away, the primary clock signal 210 or 211 is detected as having recovered in step 130. In step 140, the transceiver chip 10 switches back to the primary clock signal 210 or 211, upon recovery, from the secondary clock signal 215 through the multiplexer 220 in accordance with an embodiment of the present invention.

During the process of switching from the secondary clock signal 215 back to the primary clock signal 210 or 211, glitches may occur on the primary clock signal 210 or 211. The glitches may occur because the phase condition of the recovered primary clock signal 210 or 211 may not be guaranteed during the switching process. As a result, data being clocked into the outbound section 200 of the transceiver chip 10 from the system-side may be corrupted.

In order to account for the possibility of glitches on the primary clock signal 210 or 211 and, therefore, undesirable clocking effects, certain circuitry in a receive subsection 240 of the outbound section 200 of the transceiver chip 10 is selectively reset, in step 150, to an initial state in accordance with an embodiment of the present invention. The certain circuitry that is selectively reset, immediately after switching from the secondary clock signal 215 to the primary clock signal 210 or 211, is within an STS-to-optical-carrier mapper 230, in accordance with an embodiment of the present invention, and corresponds to a single primary clock domain.

Figure 5:
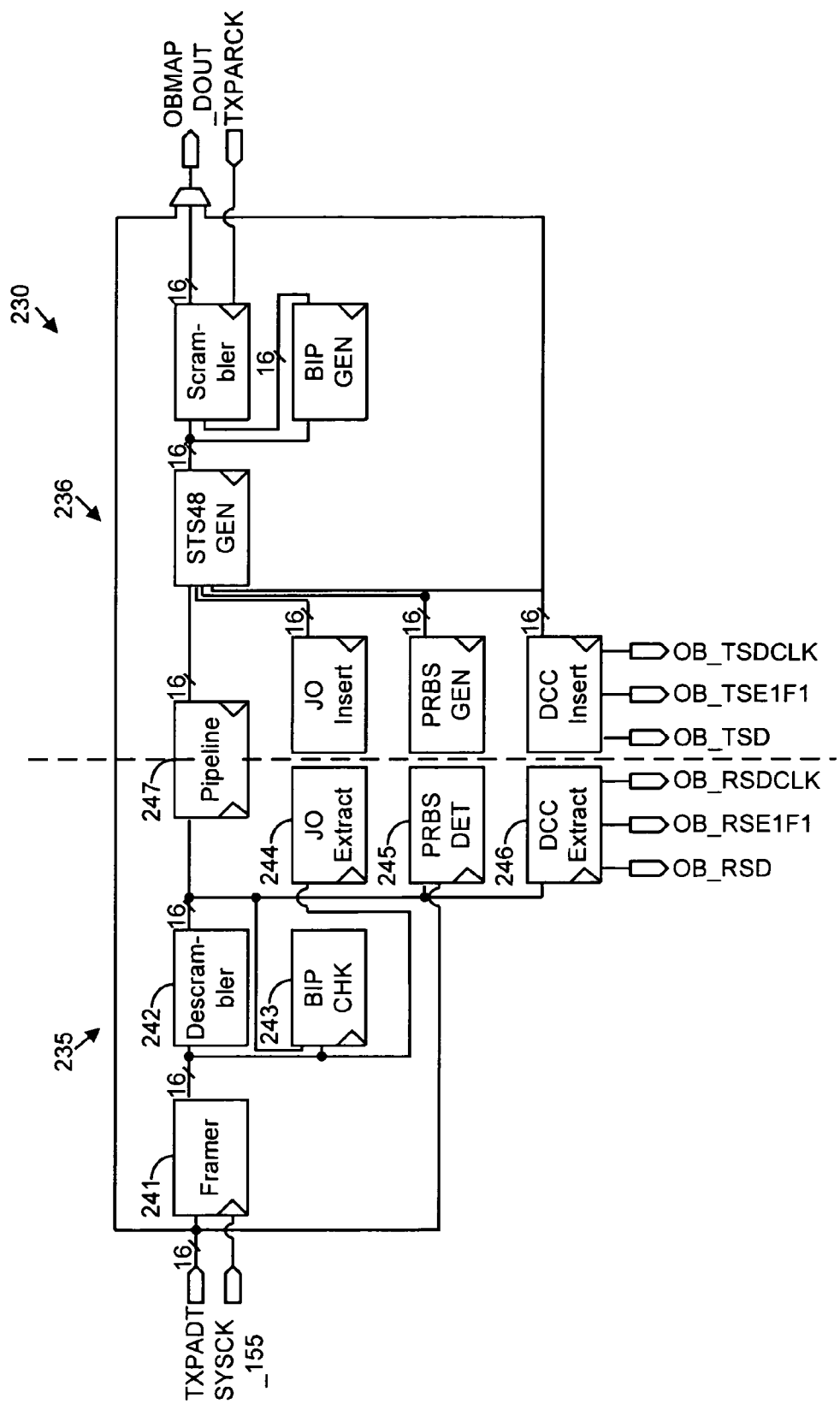
FIG. 5 is a schematic block diagram of an outbound STS-to-optical-carrier mapper within the outbound section of the transceiver chip of FIG. 1 in accordance with an embodiment of the present invention.

In accordance with an embodiment of the present invention, the STS-to-optical carrier mapper 230 is used to map STS-48 formatted data from the system-side of the transceiver chip 10 to one of an OC-3, OC-12, or OC-48 data format. Referring to FIG. 5, the mapper 230 may be viewed as comprising two subsections, 235 and 236. The circuitry within subsection 235 of the mapper 230 is automatically reset when switching from the secondary clock signal 215 to the primary clock signal 210 or 211 in accordance with an embodiment of the present invention. The circuitry within subsection 235 comprises a clock domain of primary clock signal 210 or 211 and is reset by signals generated within a centralized clock block within the transceiver chip 10. The resetting process is all performed internally to the transceiver chip 10 in hardware.

The circuitry within subsection 235 of the mapper 230 comprises a framer 241, a descrambler 242, a BIP CHK circuit 243, a J0 Extract circuit 244, a PRBS Detect circuit 245, a DCC Extract circuit 246, and a pipeline circuit 247 in accordance with an embodiment of the present invention.

When the circuitry within subsection 235 is reset to avoid effects of primary clock signal glitches, a line-side (i.e., transmit subsection 250) of the outbound section 200 of the transceiver chip 10 is unaffected. In other words, uncorrupted serial data continues to be transmitted out of the outbound section 200 of the transceiver chip 10. However, a small amount of data may be lost during the recovery/resetting process (i.e., method 100).

As a result, the transceiver chip 10 may recover from any primary clock signal problems automatically and quickly, without outside system level intervention, and without transmitting corrupted data out of the transceiver chip 10 during the recovery/resetting process (i.e., method 100).

In alternative embodiments of the present invention, the transceiver chip 10 may actively detect glitches on the primary clock signal and only perform the resetting if at least one glitch is detected. Also, embodiments of the present invention are not limited to optical communication systems.

The various elements of the apparatus and method may be combined or separated according to various embodiments of the present invention. For example, the multiplexer 220 may be integrated into the mapper 230 along with other associated circuitry.

In summary, certain embodiments of the present invention afford an approach to aid a transceiver chip in recovering from a system-side, out-bound data clocking problem. Certain circuitry of the outbound section of the transceiver chip is selectively and automatically reset in hardware within the transceiver chip without outside system level intervention and without transmitting corrupted data out of the outbound section of the transceiver chip.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a transceiver chip used in high-speed serial data communications, a method to aid said transceiver chip in recovering from a system-side, out-bound clocking problem, said method comprising:

detecting, within said transceiver chip, a problem with a primary clock signal used to clock data from said system-side of said transceiver chip through at least a part of an out-bound data path of said transceiver chip;

substituting said primary clock signal with a secondary clock signal generated within said transceiver chip when said problem is detected, to clock data from said system-side through said at least a part of said out-bound data path of said transceiver chip;

detecting, within said transceiver chip, a recovery of said primary clock signal;

switching from said secondary clock signal to said primary clock signal, when said recovery is detected, to clock data from said system-side through said at least a part of said out-bound data path of said transceiver chip; and resetting, automatically, certain discrete circuits of said out-bound data path of said transceiver chip, without system level intervention, after performing said switching.

2. The method of claim 1 wherein said certain discrete circuits are part of an STS-to-optical-carrier mapper within a receive subsection of said out-bound data path of said transceiver chip.

3. The method of claim 1 wherein said detecting said problem comprises detecting a loss-of-lock condition for a serial data SONET mode of said out-bound data path.

4. The method of claim 1 wherein said detecting said problem comprises detecting a loss-of-activity condition for a parallel data SONET mode of said out-bound data path.

5. The method of claim 1 wherein said secondary clock signal is generated by a clock multiplier unit within said transceiver chip.

6. The method of claim 1 wherein said detectings, substituting, and switching are all done automatically in hardware within said out-bound data path of said transceiver chip without said system level intervention.

7. The method of claim 1 wherein a transmit subsection of said out-bound data path of said transceiver chip is unaffected by said resetting.

8. The method of claim 1 wherein said certain discrete circuits comprise a clock domain of said primary clock signal.

9. The method of claim 1 wherein said resetting brings said certain discrete circuits into an initial state without said system level intervention.

10. The method of claim 1 wherein said transceiver chip interfaces between an optical module on a serial line side and a framer or ASIC on a system side in a data communications system.

11. In a transceiver chip used in high-speed serial data communications, apparatus to aid said transceiver chip in recovering from said system-side, out-bound clocking problem, said apparatus comprising:
at least one clock error detector, within said transceiver chip, to generate at least one fault signal indicating whether or not there is a problem with a primary clock signal used to clock data from a system-side of said transceiver chip through at least a part of an out-bound data path of said transceiver chip;
at least one multiplexer, within said transceiver chip, responsive to said at least one fault signal to switch back and forth between said primary clock signal and a secondary clock signal, generated within said transceiver chip to clock data from said system-side through said at least a part of said out-bound data path of said transceiver chip; and
at least one reset circuit to generate at least one reset signal to reset certain discrete circuits of said out-bound data path of said transceiver chip, after switching from said secondary clock signal to said primary clock signal, without system level intervention.

12. The apparatus of claim 11 wherein said at least one clock error detector comprises a loss-of-lock circuit generating a loss-of-lock fault signal for a serial data SONET mode of said out-bound data path.

13. The apparatus of claim 11 wherein said at least one clock error detector comprises a loss-of-activity circuit generating a loss-of-activity fault signal for a parallel data SONET mode of said out-bound data path.

14. The apparatus of claim 11 further comprising a clock multiplier unit (CMU) to generate said secondary clock signal within said transceiver chip.

15. The apparatus of claim 11 wherein said certain discrete circuits are part of an STS-to-optical-carrier mapper within a receive subsection of said out-bound data path of said transceiver chip.

16. The apparatus of claim 11 wherein said certain discrete circuits comprise at least a framer, a descrambler, a BIP CHK circuit, and an extraction circuit within a STS-to-optical-carrier mapper within a receive subsection of said out-bound data path of said transceiver chip.

17. The apparatus of claim 11 wherein said certain discrete circuits comprise a clock domain of said primary clock signal.

18. The apparatus of claim 11 wherein a transmit subsection of said out-bound data path of said transceiver chip is unaffected by said at least one reset circuit.

19. The apparatus of claim 11 wherein said at least one reset signal brings said certain discrete circuits into an initial state without said system level intervention.

20. The apparatus of claim 11 wherein said transceiver chip interfaces between an optical module on a serial line side and a framer or ASIC on a system side in a data communications system.

21. The apparatus of claim 11 wherein said at least one reset circuit is part of a centralized clock block of said transceiver chip.

22. A method of transmitting data from a system side of a transceiver chip to an outbound section of said transmitter chip comprising:
detecting a loss-of-lock or loss-of-activity condition of a primary clock signal used for clocking said data;
substituting a secondary clock signal in place of said primary clock signal;
switching from said secondary to said primary clock signal when said loss-of lock or loss-of-activity condition subsides;
resetting a circuitry located within an STS-to-optical-carrier mapper to an initial state to remove glitches affecting said primary clock signal, said mapper used to map STS-48 formatted data from said system side of said transceiver to OC-3, OC-12, or OC-48 formatted data, said resetting unaffecting a transmit subsection of an outbound section of said transceiver chip.

23. The method of claim 22 wherein said transceiver chip actively detects glitches in said primary clock signal and performs said resetting if at least one of said glitches is detected.

* * * * *